Feb. 23, 1971  R. T. CATIGNANI  3,564,752
REEL ATTACHMENT

Filed Jan. 27, 1970  5 Sheets-Sheet 1

INVENTOR:
ROBERT T. CATIGNANI
BY Bradley Cohn
ATTORNEY

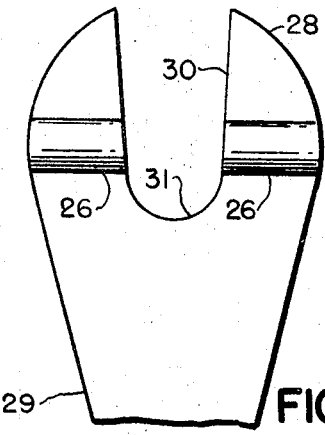
FIG.3
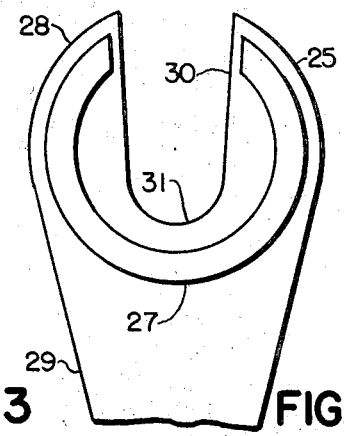
FIG.4
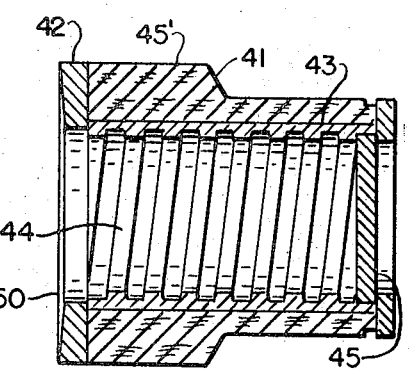
FIG.6
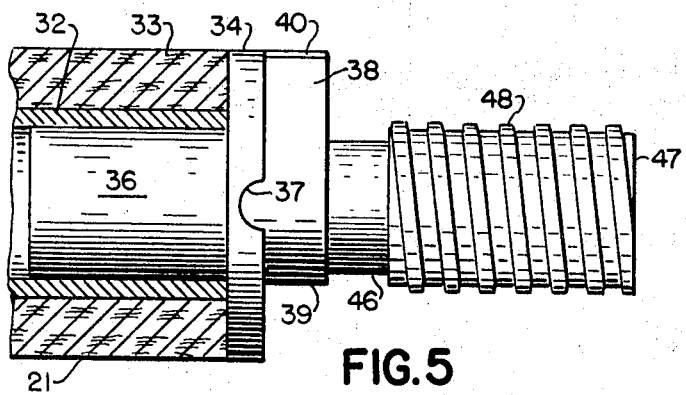
FIG.5
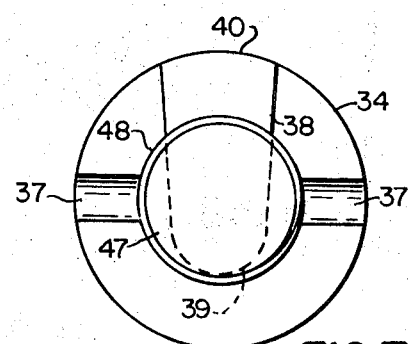
FIG.7
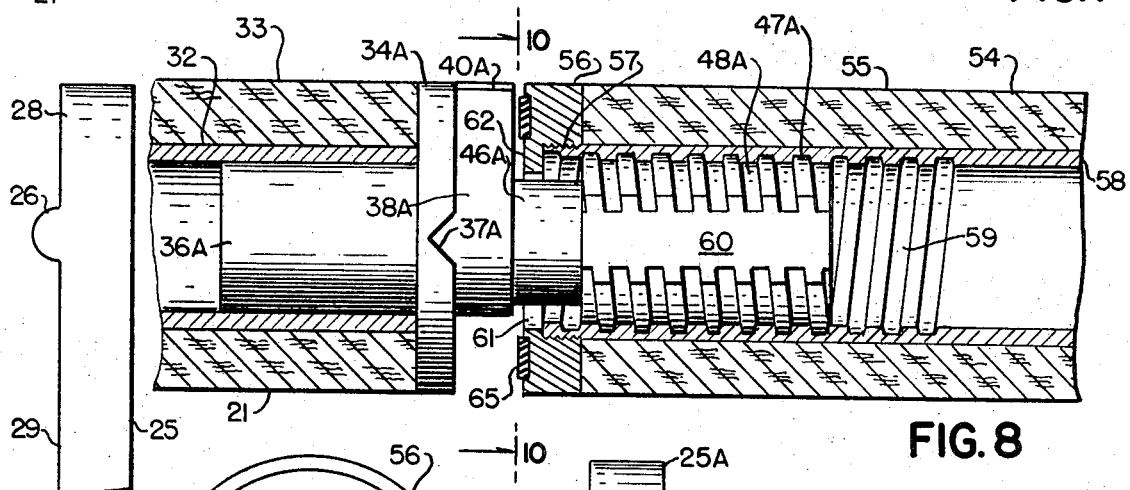
FIG.8
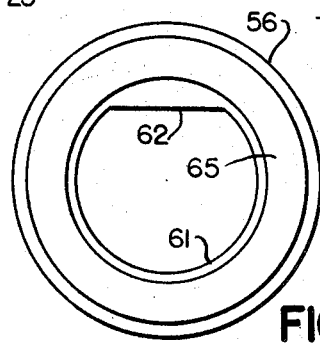
FIG.9
FIG.10
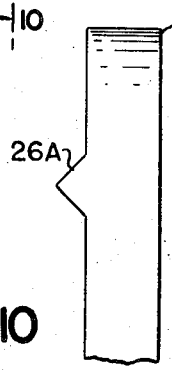
FIG.11

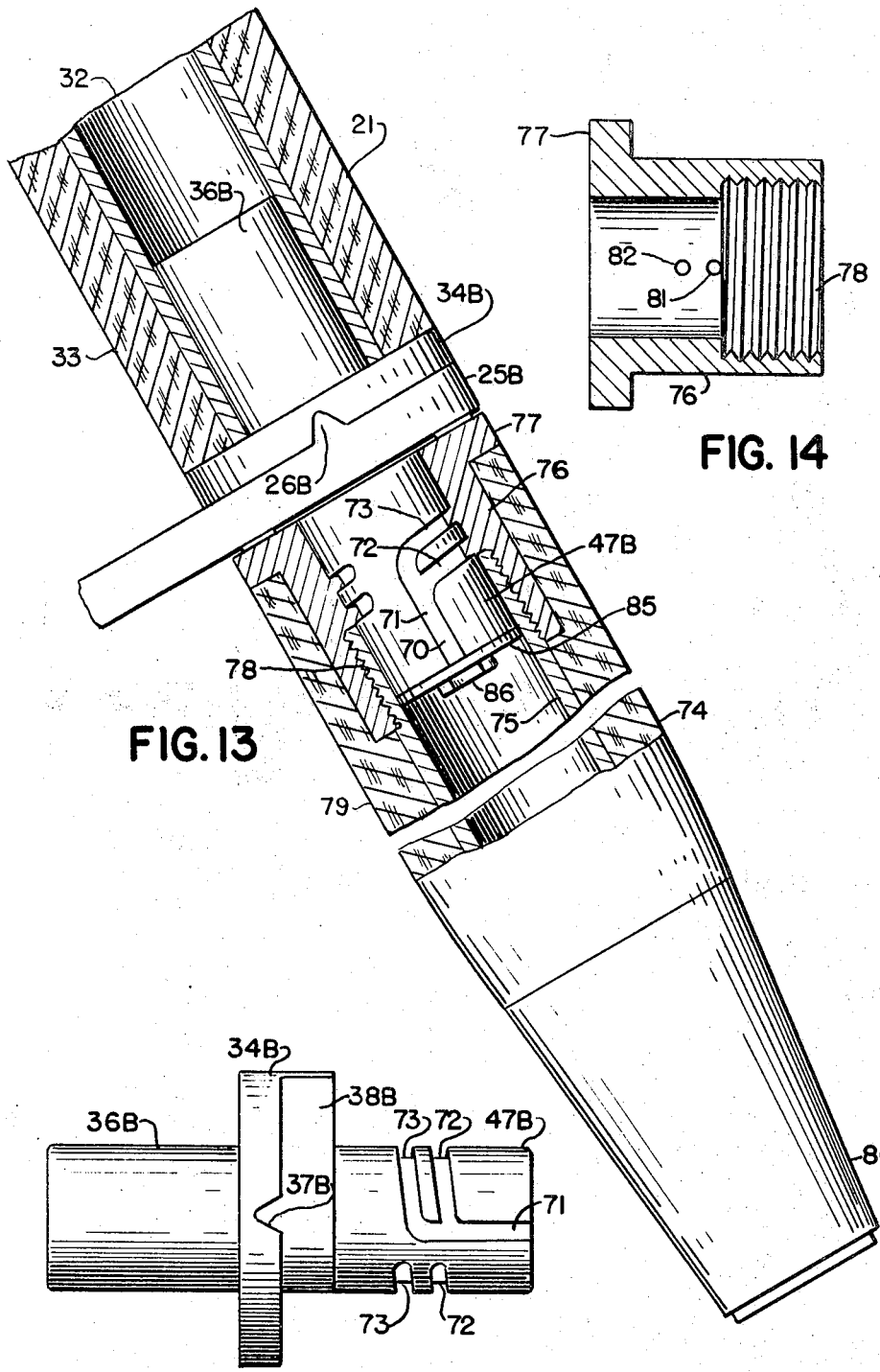

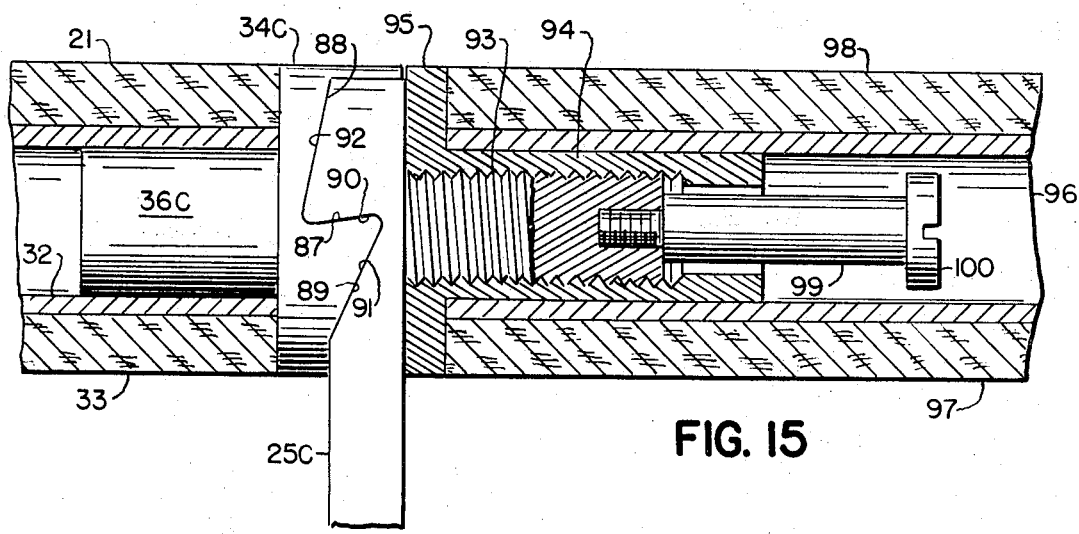
FIG. 15
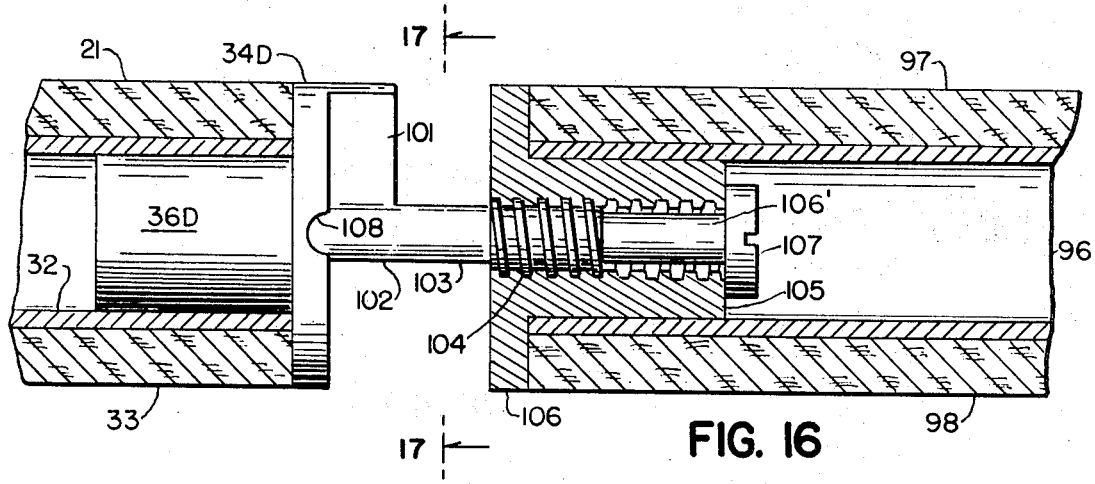
FIG. 16
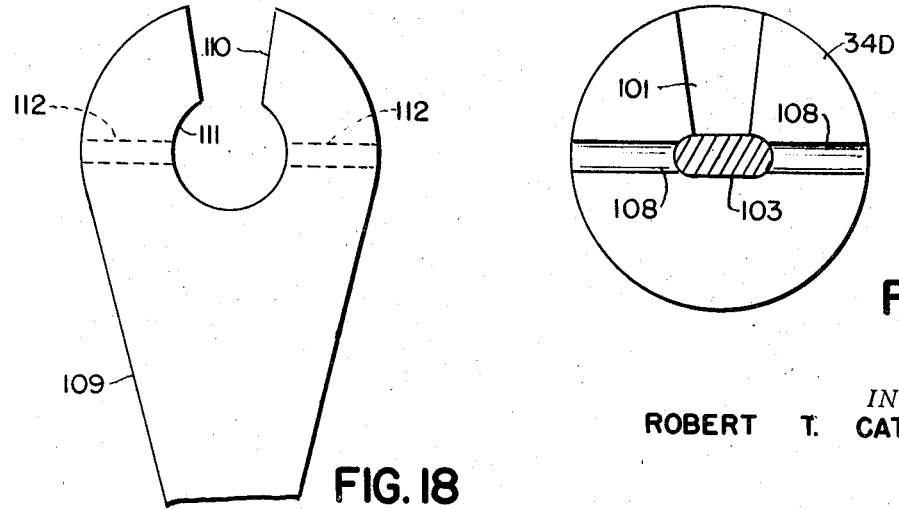
FIG. 17
FIG. 18

INVENTOR:
ROBERT T. CATIGNANI

United States Patent Office 3,564,752
Patented Feb. 23, 1971

3,564,752
REEL ATTACHMENT
Robert Thomas Catignani, Fort Lee, N.J., assignor to The Garcia Corporation, a corporation of New Jersey
Continuation-in-part of application Ser. No. 809,500, Mar. 24, 1969. This application Jan. 27, 1970, Ser. No. 6,145
Int. Cl. A01k 87/06
U.S. Cl. 43—22    20 Claims

ABSTRACT OF THE DISCLOSURE

A spinning reel is attached to a fishing rod handle, the spinning reel having a rearwardly-extending stalk terminating in a flat foot containing a tapered crotch, the fishing rod handle having a rear flange, a tapered saddle projecting from the rear flange to extend within the tapered crotch, and a clamping disk adapted to be screwed toward the rear flange to secure the foot therebetween, the foot and the rear flange having mating projections and recesses locking the flat foot in place. A male threaded element extends rearwardly from the saddle to have a rearwardly-extending portion of the clamping disk turned about it with means to prevent the complete unscrewing and removal of the clamping disk.

CROSS-REFERENCE TO RELATED APPLICATION

This application is a continuation-in-part of my patent application Ser. No. 809,500, filed Mar. 24, 1969, now abandoned.

BACKGROUND OF THE INVENTION

Heretofore, spinning reels have had an upwardly-extending stalk with a foot that is detachably fixed to the handle of a fishing rod. In operation, the fingers of a user grasping the handle adjacent to the reel have extended on each side of the stalk. Thus, a user must shift his hand at least a finger width along the handle if he wishes to change his grip to manipulate the reel.

SUMMARY OF THE INVENTION

A spinning reel having a rearwardly-extending stalk is attached to the butt of the handle of a fishing rod. The stalk terminates in a transverse, rounded flat foot containing a tapered crotch and having a pair of locking lugs projecting forward from it. The butt of the fishing rod handle has a rear flange containing grooves to receive the locking lugs of the foot. A saddle projects rearwardly from the rear flange to have the crotch of the foot extend about it. A clamping disk has a threaded element connected thereto to be turned toward the flange to clamp and secure the foot therebetween. Means are provided to prevent the complete unscrewing and removal of the clamping disk and its threaded element.

Another embodiment of this invention has a horizontally flattened shank formed to extend rearwardly from the tappered saddle. The foot contains a large enough central opening at the end of the crotch to accommodate the flattened shank. The flat foot cannot then be disengaged from the rod until it is moved rearwardly, rotated through 90 degrees, and pulled from the side of the flattened shank.

A further embodiment provides a saddle and a crotch with both disposed horizontally at 90 degrees with the reel stalk. The flat foot is then placed from one side onto the rod handle and secured in position.

The rearwardly-extending stalk of the reel of this invention is secured by its foot to the butt of the handle of a fishing rod. Thus the attachment of the reel to the handle is completely behind the hand of a user grasping the handle so that a user may grasp the handle wherever it is most convenient for him to allow him to manipulate the reel.

The fishing reel attachment of this invention more solidly attaches a reel to a rod with a fixed and locked orientation. This attachment means also allows reels to be more quickly and easily removed and replaced. The clamping disk and its threaded element may have a handle extension fixed thereto to transform a given rod into a two-handed rod if desired.

Many other advantages and features of invention will be apparent from the following description and accompanying drawings.

DESCRIPTION OF THE DRAWINGS

FIG. 3 is a front view of a spinning reel foot with the stalk broken away;

FIG. 4 is a rear view of a spinning reel foot with the stalk broken away;

FIG. 5 is a side view of a rear flange, saddle, and male threaded element mounted in the butt end of a broken away rod handle which is shown in longitudinal section;

FIG. 6 is a longitudinal, vertical section through a first form of a clamping disk and associated female threaded element;

FIG. 7 is an end view of the rear flange, saddle, and male threaded element of FIG. 5;

FIG. 8 is a longitudinal section through a fragment of a handle extension and the broken away rear end of a rod handle showing means securing the handle extension from easy removal from the rod handle;

FIG. 9 is a side view of a broken away foot with a first lug configuration to fit the rear flange of FIG. 5;

FIG. 10 is a front end view of the handle extension of FIG. 8;

FIG. 11 is a side view of a broken away foot with a second lug configuration to fit the rear flange of FIG. 8;

FIG. 12 is a side view of an integrally formed flange, saddle, and male threaded element for quick-release attachment of a reel according to a second embodiment of this invention;

FIG. 13 is a longitudinal section through fragments of an assembled quick release reel securing fishing rod handle having a handle extension, the quick-release reel securing handle shown securing the broken away foot of a reel;

FIG. 14 is a longitudinal section through a clamping disk and an integrally formed female element;

FIG. 15 is a side view of fragments of an assembled reel securing fishing rod handle having elements broken away in longitudinal, vertical section showing a third embodiment of this invention;

FIG. 16 is a side view of an assembled fishing rod handle with its reel removed and with elements broken away in longitudinal, vertical section showing a fourth embodiment of this invention;

FIG. 17 is a section taken on line 17—17 of FIG. 16;

FIG. 18 is a rear view of a broken away foot which may be secured to the rod handle of FIG. 16;

DESCRIPTION OF THE PREFERRED EMBODIMENTS

Figure 1:
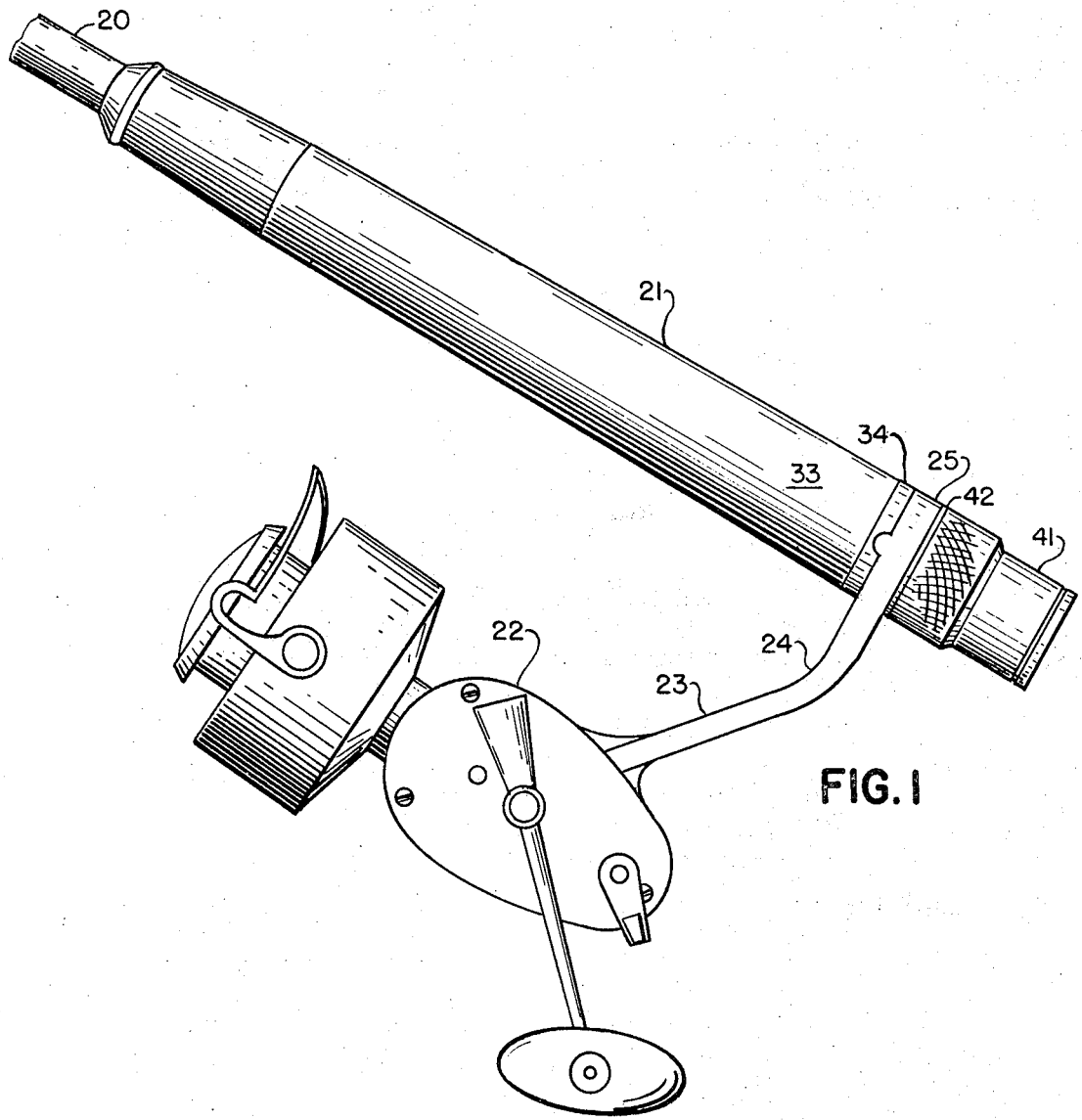
FIG. 1 is a side view of a spinning reel mounted on a fishing rod handle according to this invention with the fishing rod shown broken away.
Figure 2:
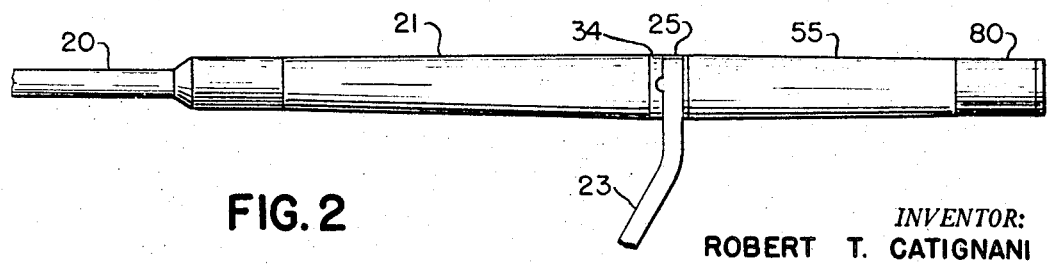
FIG. 2 is a side view of a broken-away spinning reel stalk mounted on a fishing rod handle having a butt handle extension.

As shown in FIG. 1, a fishing rod 20 has a handle 21 attached thereto in a conventional manner. A spinning reel or the like 22 has a rearwardly extending stalk 23 which curves upward at 24 to terminate in the flat transverse foot 25.

As may be seen in FIGS. 3 and 4, the flat foot 25 has two locking lugs 26, which are semi-circular in section, formed on its front face and it has a raised pressure ring 27 formed on its rear face. Foot 25 is circular in its periphery 28 and tapers at its base 29 toward stalk 23. Foot 25 contains an upward facing tapering crotch 30 which has a circular bottom portion 31.

Referring now to FIGS. 5 and 7, the handle 21 consists of an aluminum tube 32 covered by a cork sleeve 33. A rear flange 34 is fixed to the butt end of handle 21 by means of a cylindrical projection 36 which is cemented or otherwise secured in tube 32. Projection 36 may be hollowed out for weight reduction if desired. Rear flange 34 contains two grooves 37 which are semi-circular in section. A saddle 38 is integrally formed to project rearwardly from flange 34. Sadle 38 tapers downwardly to terminate in a rounded bottom portion 39. The top 40 of saddle 38 has the same radius as the circular flange 34. Extending rearwardly from saddle 38 is a necked-down portion 46 from which a larger diameter male threaded element 47 extends having the threads 48 formed thereon.

Referring now to FIG. 6, a locking member 41 has a locking disk 42 welded or otherwise secured to the front end of a tube 43 containing the internal threads 44. A disk 45 may close the rear end of tube 43. Tube 43 may be formed with a suitable cover 45' thereon if desired.

The embodiment of the invention shown in FIGS. 1, 3–7, and 9 would be used to secure a reel 22 to a handle 21 in the following manner. Locking member 41 would be turned to back it off the threads 48 of element 47. The foot 25 of a reel 22 would be slipped upward between rear flange 34 and locking disk 42 with the tapered crotch 30 extending snugly about saddle 38. The locking lugs 26 are then disposed directly behind the grooves 37 so that turning and tightening locking member 41 seats the lugs 26 in the grooves 37. The front face 50 of disk 42 is chamfered inward toward its center so that face 50 tends to position and further secure foot 25 by means of the upstanding pressure ring 27.

As may be seen in FIG. 1, the radius of the periphery 28 of foot 25 is the same as that of rear flange 34, disk 42, and the top 40 of saddle 38 so that the assembled rod and reel present a smooth unbroken, and aesthetically pleasing appearance. This is an important market consideration and also enables the rod and reel to be better used as there are no projections to snag on clothing or the like.

FIGS. 2, 8, 10 and 11 show three modifications of this invention which the same reference numbers will be used to indicate elements identical to those already described. The first modification involves the provision of a pair of locking lugs 26A which are triangular in section on the foot 25A. Flange 34A is provided with corresponding grooves 37A which receive the lugs 26A.

The second modification involves the replacement of the locking element 41 with a handle extension 55. Handle extension 55 terminates in a locking ring 56 which is screwed by means of the fine threads 57 to the front end of a tube 58 which has the internal threads 59 formed therein and is covered with the cork sleeve 54. The tube 58 is screwed over the male threaded element 47A in the manner which has been described to lock the foot of a reel 22 in place. Thus it may be seen that a given rod 20 and handle 21 may be converted from a one-handed to a two-handed rod by either using a locking element 41 or a handle extension 55 to lock a reel 22 in place.

The third modification, shown particularly in FIGS. 8 and 10, provides handle 21 with a male threaded element 47A having at least one flat 60 formed on it. The locking ring 56 has an annular front flange 61 which is slightly larger in diameter than the diameter of the threads 48A. Flange 61 also has a chord-shaped portion 62. Flange 61 and chord 62 are formed to just fit longitudinally over element 47A with the chord 62 passing over the flat 60. When the locking ring 56 is disposed over the smaller diameter necked-down portion 46A, handle extension 55 may be screwed over the threads 48A of male element 47A to allow locking ring 56, which turns freely about portion 46A, to be screwed in place on tube 58 by means of the fine threads 57. If desired, locking ring 56 may be cemented, secured with set screws, or fixed in any other manner to the end of handle extension 55. Once locking ring 56 is secured in place, chord 62 will not pass over the threads 48A so that handle extension 55 cannot be then removed.

The foregoing feature of the invention, which may be applied to a handle extension 55 or a short locking element 41, serves two purposes. First, it prevents either a handle extension 55 or a locking element 41 from accidentally working loose and falling from a rod. Second, it prevents the easy theft of handle extensions 55 or locking elements 41 from rods displayed in stores to all elements of public.

Locking ring 56 is shown with a resilient ring 65 cemented in a groove in its front face to make a snug contact with the back surface of a reel foot 25. It is to be noted that flange 34 and locking ring 56 serve as end covers to protect the easily broken ends of the cork handle sleeves 33 and 54.

A second embodiment of this invention is shown in FIGS. 12–14. In this embodiment, a rod handle 21 contains a tube 32 with a cork outer sleeve 33. A projection 36B fixed in tube 32 secures the rear flange 34B to the end of handle 21. A saddle 38B is formed integrally with flange 34B and has the quick-release male threaded element 47B extending rearwardly therefrom.

Two sets of quick-release threads 70 are cut in the sides of element 47B. For two lug contact as shown, the set of threads 70 each have a rearward longitudinal thread 71 which extends forward to branch and curve smoothly into the two parallel spiral threads 72 and 73. Handle extension 74 has a tubular center 75 which has a locking sleeve 76 and a locking disk 77 secured thereto by means of the threads 78 or any other suitable means. Sleeve 67 and locking ring 77 may be integrally formed. A cork sleeve 79 covers tube 75 and has a butt cap 80 fixed to its end.

The locking sleeve 76 has two pairs of lugs 81 and 82 which project inward to extend into the longitudinal threads 71 and the spiral threads 72 and 73 of each set of threads 70. Handle extension 74 may thus be slipped forward over element 47B with the lugs 81 and 82 sliding in the longitudinal threads 71. A washer 85 is fixed by a bolt 86 to the end of element 47B to cover the ends of the longitudinal threads 71 and prevent the complete release and detachment of handle extension 74. Butt cap 80 may be removed from handle extension 74 to allow washer 85 to be fixed in place.

The foot 25B of a reel 22 may be locked in place by sliding handle extension 74 forward and turning it to force it against and clamp foot 25B. Locking lugs 26B on foot 25B engage the corresponding grooves 37B in flange 34B. The lugs 26B are triangular in section with a slightly rounded nose portion. The quick-release embodiment of this invention may be used with a short locking element (not shown) as well as with the handle extension 74.

It is to be noted that in all embodiments of this invention the reel foot 25, 25A, or 25B should be slightly thicker than the length of the saddle over which it fits to allow the foot to be clamped by a locking disk 42, 56, or 77 without interference by the saddle.

As shown in FIG. 15, a third embodiment of this invention has a rod handle 21 containing a tube 32 with a cork outer sleeve 33. A projection 36C fixed in tube 32 secures the rear flange 34C to the end of handle 21. A saddle (not shown) similar to that shown in FIG. 5 is formed integrally with flange 34C so that foot 25C may fit about it. Flange 34C has an upward facing ridge 87 formed like a hook on its rear surface between the sloping surfaces 88 and 89. Foot 25C has mating surfaces 90, 91 and 92.

Projecting rearwardly from the saddle of rear flange 34C is a threaded stud 93. An internally threaded member 94 is turned about stud 93 and has a locking flange 95 integrally formed at its forward end. A tube 96 and a cork grip 97 of a butt extension 98 is fixed to member 94. A projecting stop 99 with a large head 100 is turned into the end of stud 93 so that head 100 prevents the complete removal of extension 98. The particular construction of rear flange 34C and foot 25C allows considerable loosening of butt 98 before foot 25C can accidentally drop away.

FIGS. 16–18 show a fourth embodiment of this invention. A rod handle 21 contains a tube 32 with a cork outer sleeve 33. A projection 36D fixed in tube 32 secures the rear flange 34D to the end of handle 21. A tapered saddle 101 has a horizontally-flattened lower portion 102 which extends rearwardly forming a flattened shank 103. Behind shank 103 there is integrally formed a threaded portion 104. An internally-threaded member 105 is formed integrally with the locking flange 106 to be turned over the threaded portion 104. It is secured against removal from threaded portion 104 by means of a stud 106' having a large head 107. A tube 96 and a cork grip 97 of a butt extension 98 is fixed to threaded portion 104. Flange 34D contains the locking grooves 108.

The foot 109 has a tapered crotch 110 which engages the tapered saddle 101. Below crotch 110 is a large central opening 111 so that crotch 110 may be positioned horizontally and slipped past the narrowest dimension of shank 103 and rotated into a depending vertical position. The largest dimension or width of shank 103 will then extend laterally in opening 111. The foot 109 may be pressed forward to place crotch 110 about saddle 101 and the locking flange 106 may be turned forward to clamp foot 109 with its locking ridges 112 extending into the locking grooves 108. This construction prevents the foot 109 from dropping from the rod handle even if the butt extension 98 is accidentally loosened as the width of shank 103 will not pass through the narrow lower end of crotch 110.

Figure 19:
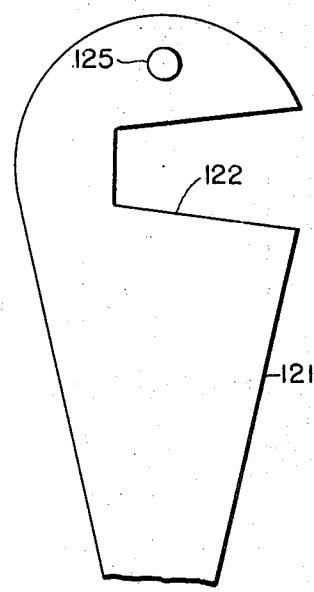
FIGS. 19 and 20 are front and side views, respectively, of a broken away foot which may be secured to the rod handle of a fifth embodiment of this invention.
Figure 20:
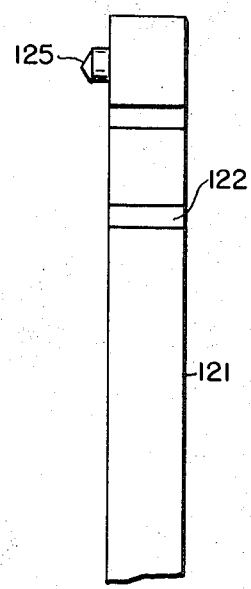
Figure 21:
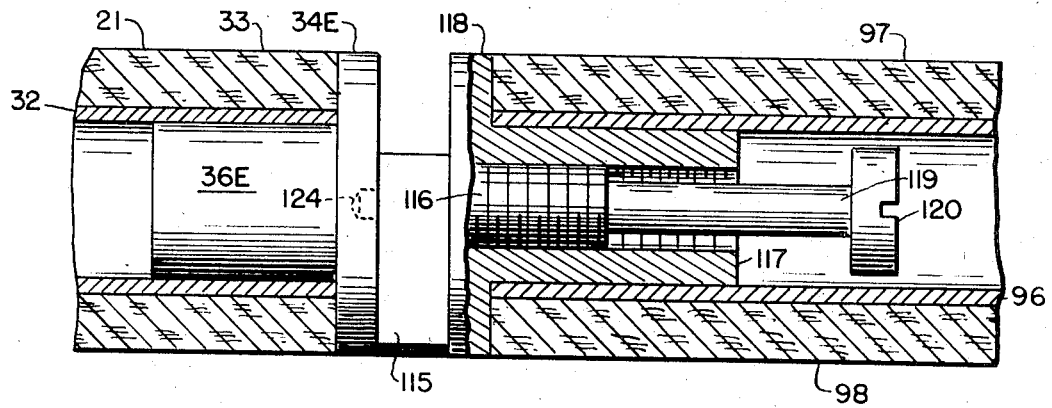
FIG. 21 is a top view of fragments of an assembled fishing rod handle with its reel removed and with elements broken away in longitudinal, horizontal section showing a fifth embodiment of this invention.

Referring now to FIGS. 19–21, the fifth embodiment of this invention has a rod handle 21 which contains a tube 32 with a cork outer sleeve 33. A projection 36E secures the rear flange 34E to the end of handle 21. Projecting rearwardly from flange 34E is the saddle 115 having a central threaded element 116 extending therefrom. An internally threaded member 117 is screwed about element 116 and has the locking flange 118 formed integrally therewith. A stud 119 with a large head 120 prevents the complete removal of member 117 with its attached tube 96 and cork grip 97.

Foot 121 has a laterally-extending tapered crotch 122 which fits over saddle 115. A single locking aperture 124 in flange 34E receives the single locking stud 125 projecting from foot 121 when the handle extension 98 is turned to clamp foot 121 between flanges 34E and 118.

While this invention has been shown and described in the best forms known, these are purely exemplary and modifications may be made without departing from the spirit and scope of the invention except as it may be more limited in the appended claims, wherein:

What is claimed is:
1. Means for attaching a reel having a rearwardly extending stalk to a fishing rod having a handle, said means comprising, in combination, a transverse flat foot of said stalk containing a crotch, a rear flange fixed to the butt end of said handle, a saddle projecting rearwardly from said flange a distance less than the thickness of said foot, said saddle having a threaded element extending therefrom, a locking disk disposed behind said saddle and having means engaging said threaded element enabling said locking disk to be moved toward said flange, clamping said foot of said reel stalk between said flange and said locking disk with said crotch disposed about said saddle locking said foot in position.

2. The combination according to claim 1 wherein said crotch and said saddle extend upward.

3. The combination according to claim 2 wherein said locking disk and said flange are circular and substantially the diameter of said handle, said saddle has a rounded top of the same radius as said flange and said locking disk, and said foot has a circular upper periphery of the same radius as said flange and said locking disk.

4. The combination according to claim 3 wherein said saddle and said crotch taper outwardly as they extend upward.

5. The combination according to claim 4 wherein said screw means comprises a male threaded element extending rearwardly from said saddle and a locking member having said locking disk on its front face, said locking member being screwed toward said handle about said threaded element to clamp said foot.

6. The combintion according to claim 5 wherein the back face of said foot has a raised pressure ring formed thereon and said locking disk has a front face chamfered inwardly to engage said pressure ring and lock said foot in position.

7. The combination according to claim 5 wherein said foot and said flange have substantially horizontal locking lugs formed thereon and corresponding grooves formed therein.

8. The combination according to claim 7 wherein said locking lugs are formed on said foot and said corresponding grooves are formed in said flange.

9. The combination according to claim 8 wherein said locking lugs and said corresponding grooves are substantially semi-circular in section.

10. The combination according to claim 8 wherein said locking lugs and said corresponding grooves are substantially triangular in section.

11. The combination according to claim 5 with the addition of a necked down portion of smaller diameter than said male threaded element disposed between said saddle and said male threaded element, and wherein said male threaded element has at least one longitudinal flat formed thereon, said locking disk has an annular front flange of greater inside diameter than the threads of said male threaded element, said annular front flange having a chord adapted to slide longitudinally over said flat and extend toward said necked down portion, and said locking member has means securing said locking disk to said locking member so that said locking member is more permanently attached to said rod handle.

12. The combination according to claim 11 wherein said means securing said locking disk to said locking member comprises fine threads on said locking member over which said locking disk is turned.

13. The combination according to claim 5 with the addition of a handle extension, said handle extension extending rearwardly from and incorporating said locking member.

14. The combination according to claim 5 wherein said male threaded element and said locking member have at least one set of quick-release threads cut therein and at least one projecting lug to enter and engage each set of quick-release threads, said quick-release threads having a substantially longitudinal portion leading to one spiral portion for each projecting lug.

15. The combination according to claim 14 wherein said at least one set of quick-release threads is cut in said male threaded element, said substantially longitudinal portion of each of said at least one set of threads extending rearwardly, and with the addition of stop means removably fixed to the back of said male threaded element blocking the end of each of said substantially longitudinal portions of said quick-release threads.

16. The combination according to claim 15 wherein said locking member has a tubular portion of the diameter of said male threaded element extending rearwardly therefrom, said stop means being a disk of the same diameter as said male threaded element inserted through the tubular member and fixed to the end of said male threaded element.

17. The combination according to claim 5 wherein said flange has a transverse hook-like locking ridge formed thereon, said ridge having an upward facing surface, said foot having a rear surface conforming to and mating with said locking ridge of said flange.

18. The combination according to claim 5 with the addition of a horizontally flattened shank between said saddle and said male threaded element, said shank being of a greater width than a portion of said crotch and of a thickness less than said crotch, said foot containing a central opening at the end of said crotch larger than the width of said crotch.

19. The combination according to claim 1 wherein said crotch and said saddle extend laterally, said locking disk and said flange being circular and substantially the diameter of said handle, said saddle having a rounded side of the same radius as said flange and said locking disk, said foot having a circular upper periphery of the same radius as said flange and said locking disk.

20. The combination according to claim 19 wherein said foot and said flange contain a locking aperture and have a projecting stud entering said locking aperture.

References Cited
UNITED STATES PATENTS

| | | | |
|---|---|---|---|
| 2,793,458 | 5/1957 | Stephens | 43—22 |
| 3,006,098 | 10/1961 | Harke | 43—22 |
| 3,175,321 | 3/1965 | Stephens | 43—22 |
| 3,310,904 | 3/1967 | Binvignat | 43—22 |

FOREIGN PATENTS

| | | | |
|---|---|---|---|
| 958,287 | 9/1949 | France | 43—22 |

SAMUEL KOREN, Primary Examiner

D. J. LEACH, Assistant Examiner